US006452903B1

United States Patent
Peck et al.

(10) Patent No.: US 6,452,903 B1
(45) Date of Patent: Sep. 17, 2002

(54) NETWORK SWITCH SUPPORTING RATE-BASED AND CREDIT-BASED FLOW CONTROL MECHANISMS ON A LINK-BY-LINK BASIS

(75) Inventors: David N. Peck, Northbridge; Thomas A. Manning, Northboro, both of MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 170 days.

(21) Appl. No.: 09/583,608

(22) Filed: May 31, 2000

(51) Int. Cl.[7] .............................................. H04L 12/28
(52) U.S. Cl. ..................... 370/235; 370/230; 370/235; 370/241.1
(58) Field of Search ................................ 370/229, 230, 370/230.1, 231, 232, 233, 235, 236.1, 236.2, 241.1, 395.1, 396, 395.5, 395.51, 395.6, 400, 465, 466, 469

(56) References Cited

U.S. PATENT DOCUMENTS

| | | |
|---|---|---|
| 4,727,537 A | 2/1988 | Nichols |
| 5,029,164 A | 7/1991 | Goldstein et al. |
| 5,084,871 A | 1/1992 | Carn et al. |
| 5,090,011 A | 2/1992 | Fukuta |
| 5,115,429 A | 5/1992 | Hluchyj et al. |
| 5,128,932 A | 7/1992 | Li |
| 5,197,067 A | 3/1993 | Fujimoto et al. |
| 5,285,446 A | 2/1994 | Yonehara |
| 5,289,463 A | 2/1994 | Mobasser |
| 5,319,638 A | 6/1994 | Lin |
| 5,422,879 A | 6/1995 | Parsons et al. |
| 5,426,635 A | 6/1995 | Mitra et al. |
| 5,432,824 A * | 7/1995 | Zheng .................. 375/356 |
| 5,455,826 A | 10/1995 | Ozveren et al. |
| 5,483,526 A | 1/1996 | Ben-Nun et al. |
| 5,491,691 A | 2/1996 | Shtayer et al. |
| 5,493,566 A | 2/1996 | Ljingberg et al. |
| 5,509,001 A | 4/1996 | Tachibana et al. |
| 5,515,359 A * | 5/1996 | Zheng .................. 370/235 |
| 5,521,905 A | 5/1996 | Olda et al. |
| 5,533,020 A | 7/1996 | Byrn et al. |
| 5,544,170 A | 8/1996 | Kasahara |
| 5,602,829 A | 2/1997 | Nie et al. ............ 370/235 |
| 5,633,861 A | 5/1997 | Hanson et al. ....... 370/232 |
| 5,719,853 A | 2/1998 | Ikeda .................. 370/229 |

(List continued on next page.)

FOREIGN PATENT DOCUMENTS

| | | | |
|---|---|---|---|
| EP | 0 805 578 A2 | 11/1987 | ............ 12/56 |
| WO | WO 97/17787 | 5/1997 | ...... H04L/12/56 |

OTHER PUBLICATIONS

Lihong, Feng et al. "Rate–based traffic control technique in credit style for ABR service in ATM networks" ICCT'98, Oct. 22–24, 1998.*

(List continued on next page.)

Primary Examiner—Hassan Kizou
Assistant Examiner—Anh-Vu H Ly
(74) Attorney, Agent, or Firm—Weingarten, Schurgin, Gagnebin & Lebovici LLP

(57) ABSTRACT

Network interface logic includes first logic executing a credit-based flow-control protocol (e.g., Quantum Flow Control or QFC) and second logic executing a rate-based flow control protocol (e.g. Explicit Rate or ER). The second logic transfers data cells between a network link and the first logic and inserts and extracts forward (FRM) and backward (BRM) flow-control/resource management (RM) cells. The second logic further (i) obtains cell buffer utilization information from the first logic, (ii) supplies transmission credits to the first logic based on rate information in BRM cells, (iii) induces the first logic to emit "dummy" RM cells when an RM cell is to be transmitted, and (iv) converts the dummy cells to either FRM or DRM cells for forwarding on the link. Rate information in the transmitted RM cells is calculated from the buffer utilization information and rate information in extracted BRM cells.

5 Claims, 11 Drawing Sheets

U.S. PATENT DOCUMENTS

| | | | |
|---|---|---|---|
| 5,909,443 A | 6/1999 | Fichou et al. | 370/412 |
| 5,978,359 A | * 11/1999 | Caldara et al. | 370/236 |
| 5,983,260 A | * 11/1999 | Hauser et al. | 709/201 |
| 6,044,406 A | * 3/2000 | Barkey et al. | 709/235 |
| 6,167,452 A | * 12/2000 | Maning et al. | 709/232 |

OTHER PUBLICATIONS

Schoenen, R. et al. "Analysis and dimensioning of credit-based flow control for the ABR service in ATM networks" Aachen University of Technology.*

Zheng, Qin et al. "Integrated rate and credit feedback control for ABR service in ATM Networks" 0–8186–7780–5/97, 1997 IEEE.*

Ryoo, Intae et al. "A study on rate and credit flow control using real–time integrated traffic management scheme for ABR services" University of Tokyo.*

ATM Forum Technical Committee, "Flow Controlled Virtual Connections Proposal for ATM Traffic Management, Revision R2", 94–0632R2, ppi–68, Sep. 1994.

ATM Forum Technical Committee, Credit–Based FCVC Proposal for ATM Traffic Management, Revision R1, 94–0168R1, ppi–29, 1994.

ATM Forum Technical Committee, "Action Item Status for Credit–Based FCVC Proposal", 94–0439, pp. 1–9, 1994.

Bonomi et al., "The Available Bit Rate Service", pp. 1–5, 1995.

Kung et al., "Credit–Based Flow Control for ATM Networks: Credit Update Protocol, Adaptive Credit Allocation, and Statistical Multiplexing", Proc. ACM SIGCOMM Symposium on Communications, Architectures, Protocols and Applications pp. 101–114, 1994.

Kung et al., "Receiver–Oriented Adaptive Buffer Allocation in Credit–Based Flow Control for ATM Networks", Proc. INFOCOM, pp. 239–252, 1995.

Jain, R., "Myths About Congestion Management in High–Speed Networks", Internetworking Research and Experience, vol. 3, pp. 101–113, 1992.

Bonomi et al., "The Rate–Based Flow Control Framework for the Available Bit Rate ATM Service", IEEE Network, pp. 25–39, Mar./Apr. 1995.

* cited by examiner

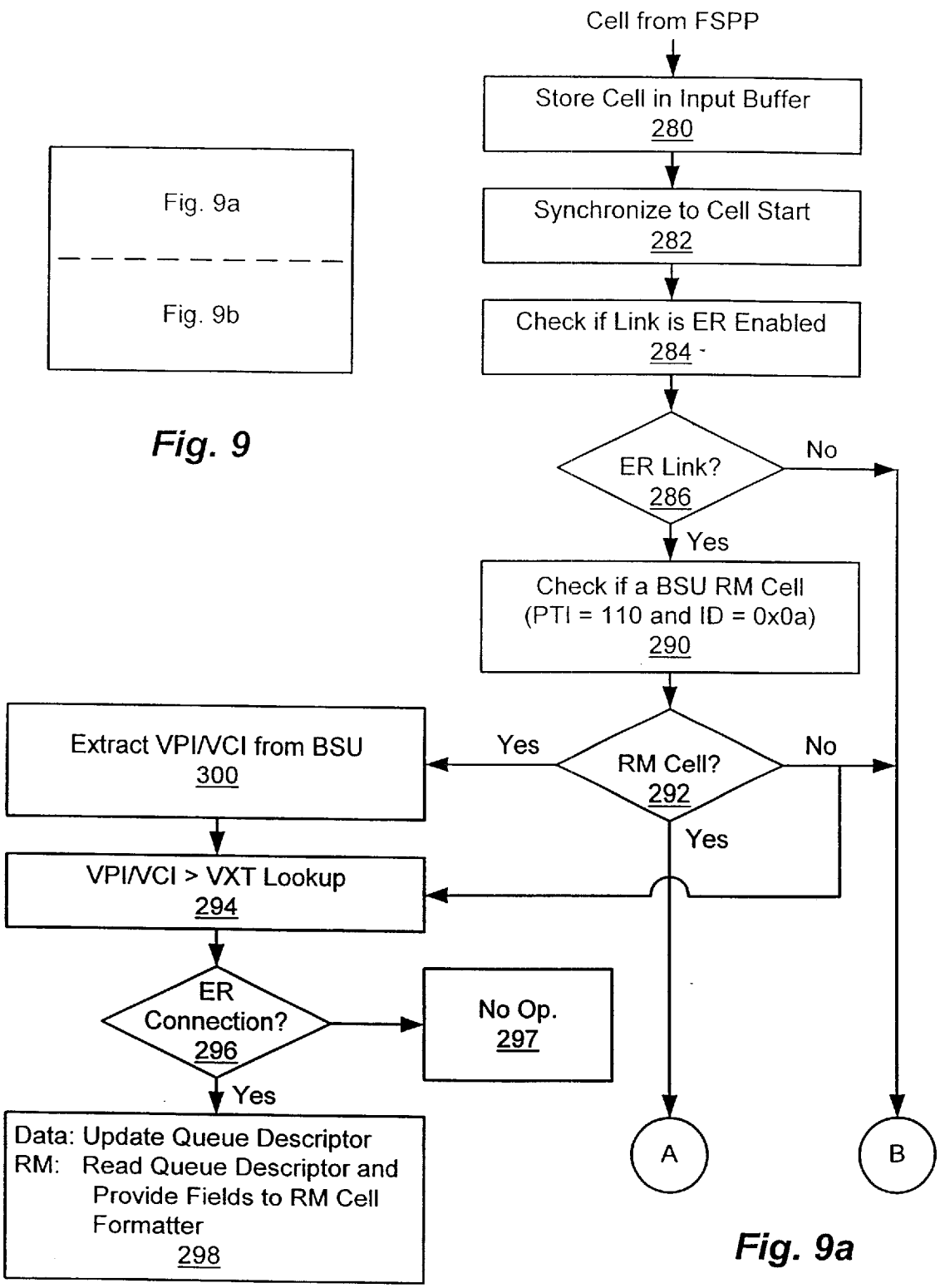

US 6,452,903 B1

NETWORK SWITCH SUPPORTING RATE-BASED AND CREDIT-BASED FLOW CONTROL MECHANISMS ON A LINK-BY-LINK BASIS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of data networks such as Asynchronous Transfer Mode (ATM) networks, and more particularly to flow-control techniques used to control the transmission of data in data networks.

The term "flow control" generally refers to intentional control exercised by network components over data traffic in the network to achieve desired operational results. For example, flow control can be used to minimize or prevent loss of data cells resulting from the overflowing of receive buffers used by various network components to temporarily store data traffic. Flow control can also be used to enforce an agreed-upon transmission capacity, or rate, available to a customer or to a network element carrying traffic from a number of customers.

One known flow-control protocol used in ATM networks is referred to as "Quantum Flow Control" or QFC. The QFC protocol can be applied to network links and/or individual virtual connections to provide a desired quality of service (QOS). One significant feature of the QFC protocol is its ability to guarantee that no transmitted cells are lost, or discarded, due to insufficient buffering at the receive end of a link or connection. To achieve this result, the QFC protocol employs a messaging scheme and associated functionality within participating network elements based on the concept of transmission credits. Transmission credits are maintained in a "pool" data structure at the transmitting end of a link or connection. A credit is consumed for each cell (or group of cells of a predetermined size) transmitted on the link or connection. The credits are replenished in response to explicit messages sent to the transmitter from the receiver. In general, the receiver extends additional credits as the received cells are forwarded out of the receiver's cell buffer. The transmitter is permitted to transmit cells only as long as there are credits in the pool. If the pool of available credits becomes empty, the transmitter must wait until the next replenishment from the receiver before resuming the transmission of cells.

Another known flow-control protocol used in ATM networks is referred to as "Explicit Rate" or ER. The ER protocol utilizes messages to convey rate information explicitly between a transmitter and a receiver. A forward-type message is used by the transmitter to inform the receiver of the actual transmission rate or a currently allowed maximum transmission rate. The receiver uses this information to generate backward-type messages that inform the transmitter whether its actual or allowed maximum transmission rate should be changed, and if so to what value. In turn, the transmitter uses the information in the backward-type messages to control its transmission rate. On a typical bidirectional link, both forward and backward flow-control messages are flowing in each direction between the respective transmitter/receiver pairs.

The flow-control messages carrying rate information in the ER protocol are different from the messages used to manage transmission credits in the QFC protocol. Thus, network interface equipment that has been designed to operate according to the QFC protocol is not compatible with equipment designed to operate according to the ER protocol, and vice-versa. Further, a given link or connection can use only one or the other protocol, but not both. As a result, one distinguishing feature of some existing network equipment is whether it supports a credit-based flow-control protocol such as QFC, or a rate-based protocol such as ER. Equipment that supports one protocol generally cannot be used in networks utilizing the other protocol, and therefore the market for each type of network equipment is correspondingly limited.

The need for different pieces of equipment to support the combined market for QFC and ER-based products can result in various undesirable inefficiencies, such as the need to design, manufacture, operate and support two different sets of components that generally operate in a similar manner, except for the type of flow-control protocol supported by the component. It would be desirable to minimize these inefficiencies in order to provide network users with more cost-effective data communications services.

BRIEF SUMMARY OF THE INVENTION

In accordance with the present invention, network interface equipment is disclosed that can be used with either a credit-based flow-control protocol such as QFC, or with a rate-based protocol such as ER. Interface logic within the equipment relies upon mechanisms used for the credit-based protocol to carry out the ER protocol, resulting in efficiencies of design, manufacturing and support that otherwise would be difficult or impossible to achieve.

The interface logic includes first cell processing logic capable of receiving cells from a network link and emitting cells for transmission on the link according to the credit-based flow-control protocol. The first cell processing logic includes a cell buffer memory in which received data cells are temporarily stored. The first cell processing logic is capable of generating and accepting flow-control buffer state messages at external interface points. The buffer state messages generated by the first cell processing logic convey information about the utilization of the cell buffer memory. The accepted messages can contain transmission credits used by the first cell processing logic to control its emission of cells in accordance with the credit-based flow-control protocol. The accepted messages can also contain information inducing the first cell processing logic to emit RM cells for transmission on the network link in accordance with the credit-based flow-control protocol.

The interface logic also contains second cell processing logic, arranged between the network link and the first cell processing logic, which has different operational characteristics depending on the type of flow-control protocol used on the network link. If the credit-based flow-control protocol is being used, the second cell processing logic operates primarily to transfer data cells and RM cells between the network link and the first cell processing logic, so that compliance with the credit-based flow-control protocol is achieved by the operation of the first cell processing logic alone.

When the rate-based flow control protocol is employed on the network link, the second cell processing logic again transfers the data cells between the network link and the first cell processing logic, but actively participates in the rate-based flow-control protocol on the network link, relying in part on credit-based functionality in the first cell processing logic.

In particular, the second cell processing logic extracts RM cells received from the network link and refrains from forwarding the extracted RM cells to the first cell processing logic. The extracted RM cells include forward RM (FRM) cells containing information about the rate at which cells are allowed to be transmitted on the network link by the remote transmitter, and backward RM (BRM) cells containing information about the rate at which cells should be transmitted on the network link to the remote receiver.

The second cell processing logic also exchanges buffer state messages with the first cell processing logic in order to obtain information about the utilization of the cell buffer memory, and to supply transmission credits to the first cell processing logic. The transmission credits are calculated based on predetermined rate parameters and the rate information in the extracted BRM cells. Also, when BRM and FRM cells are to be transmitted on the network link in accordance with the rate-based flow control protocol, the second cell processing logic generates buffer state messages that induce the first cell processing logic to generate and emit RM cells. Each of these is converted by the second cell processing logic to either an FRM cell or a BRM cell as required, and forwarded for transmission on the network link. Each BRM cell contains feedback rate information calculated from the rate information in an extracted FRM cell and from the buffer utilization information received from the first cell processing logic, and each FRM cell contains forward rate information calculated from the predetermined rate parameters and the rate information in the extracted BRM cells.

From the perspective of the first cell processing logic, the link appears to be operating according to the credit-based flow control protocol. Thus, the first cell processing logic can be coupled to a that supports the rate-based protocol or the credit-based protocol.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
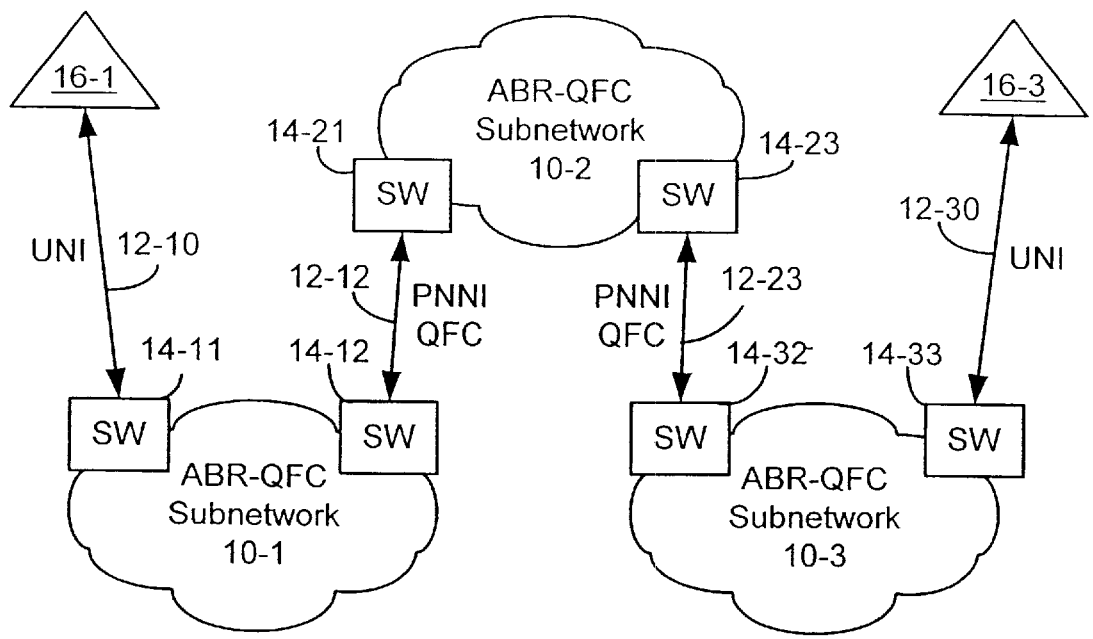
FIG. 1 is a block diagram of a prior art network employing the credit-based Quantum Flow Control (QFC) flow control protocol.

FIG. 1 shows an Asynchronous Transfer Mode (ATM) network employing the Quantum Flow Control (QFC) flow-control protocol. Three ATM subnetworks 10-1, 10-2 and 10-3 communicate via respective sets of ATM links 12-12 and 12-23. Switches 14 are shown at the "edges", or boundaries, of the subnetworks 10. Switch 14-11 in subnetwork 10-1 communicates with a user device 16-1 via a User-Network Interface (UNI) on ATM links 12-10. Similarly, switch 14-33 in subnetwork 10-3 communicates with a user device 16-3 via a UNI on ATM links 12-30. Switches 14-12 and 14-21 communicate with each other via a Private Network-to-Network Interface (PNNI) on ATM links 12-12, and switches 14-23 and 14-32 communicate via a PNNI on ATM links 12-23. As shown, the QFC protocol is employed on the ATM links 12-12 and 12-23, and is also used within each subnetwork 10.

The switches 14 shown in FIG. 1 generally employ the QFC protocol on each attached link having a QFC-capable device on the other end. If the device on the other end of a given link is not capable of operating using the QFC protocol, then the switch 14 operates the link in accordance with the ATM standard but without use of the QFC protocol If a switch 14 were to be operated in a network in which the Explicit Rate (ER) protocol is employed, the ER protocol messages would simply pass through the switch and not affect its operation. As mentioned above, however, it is desirable that network switches include ER functionality in order to achieve the benefits of ER flow control within the network.

Figure 2:
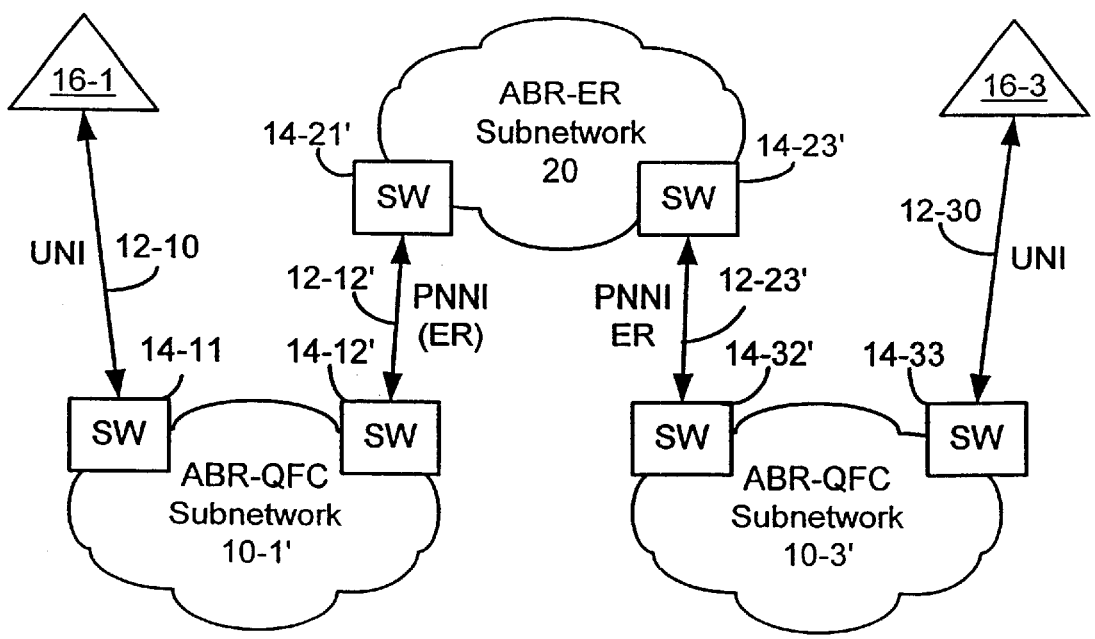
FIG. 2 is a block diagram of a network employing the Explicit Rate (ER) flow control protocol along with the QFC flow control protocol in accordance with the present invention.

FIG. 2 shows an ATM network that employs both the QFC protocol and the ER protocol. Subnetworks 10-1' and 10-3' use the QFC flow-control protocol internally. An ER subnetwork 20 is coupled to the QFC subnetworks 10-1' and 10-3' in a similar fashion to the coupling of QFC subnetwork 10-2 of FIG. 1. Links 12-12' and 12-23' and switches 14-12', 14-21', 14-23' and 14-32' are similar to counterpart links and switches in FIG. 1, except for the use of ER rather than QFC flow-control functionality. The network configurations of FIGS. 1 and 2 are illustrative only; it will be apparent to those skilled in the art that the methods and apparatus disclosed herein are more generally applicable in a variety of network configurations.

Figure 3:
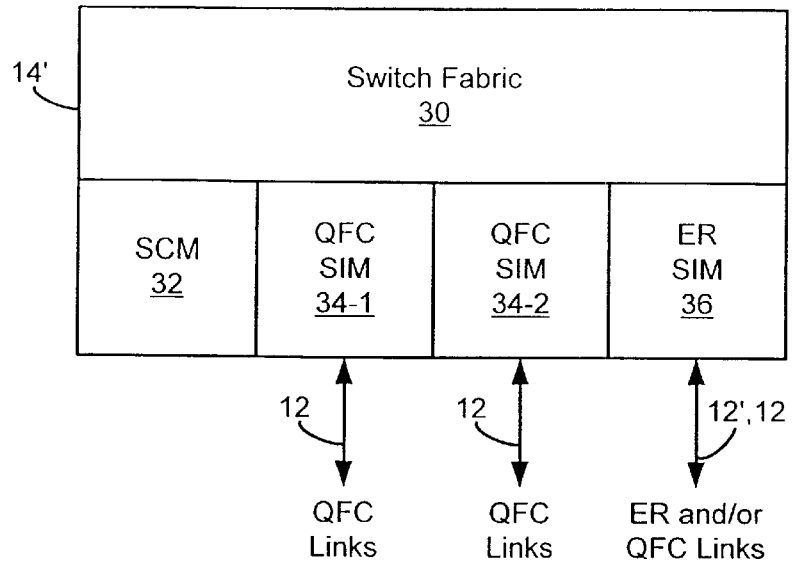
FIG. 3 is a block diagram of a network switch in the network of FIG. 2.

FIG. 3 shows the structure of the switches 14' of FIG. 2. A switch fabric 30 provides dynamically-configurable interconnections among a variety of circuit modules, including a switch control module or SCM 32, QFC-capable service interface modules (SIMs) 34-1 and 34-2, and an ER-capable SIM 36. As shown, the QFC SIMs 34 are connected to respective sets of QFC links 12, and the ER SIM 36 is connected to a set of ER links 12'. The SIMs 34 and 36 receive ATM cells from the respective links 12 and 12', forward received cells to each other via the switch fabric 30 based on the Virtual Path Identifier (VPI) and Virtual Channel Identifier (VCI) contained in the cells, and transmit cells received from the switch fabric 30 onto the respective links 12 and 12'.

Figure 4:
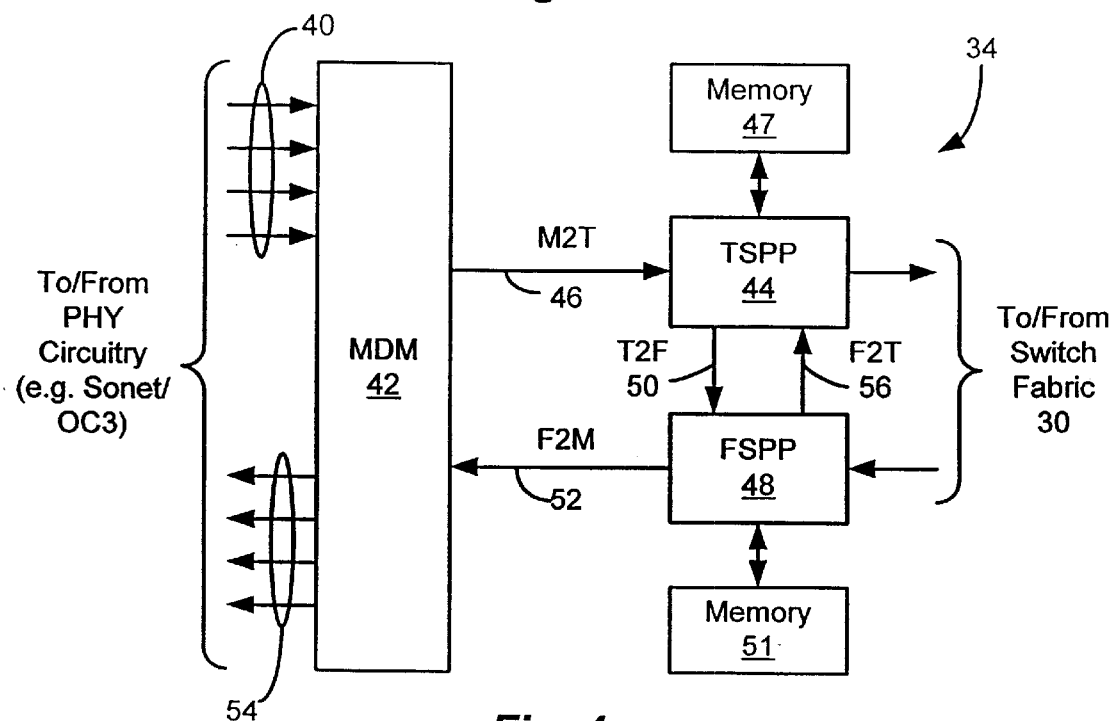
FIG. 4 is a block diagram of a prior-art service interface module (SIM) in the switch of FIG. 3.

FIG. 4 shows the structure of a QFC SIM 34. On the receive side, ATM cells are received by a multiplexerdemultiplexer (MDM) 42 from physical-layer (PHY) receive circuitry (not shown), which is in turn coupled to respective ones of the ATM links 12. The MDM 42 forwards the cells to receive cell processing logic, referred to as a To-Switch Port Processor (TSPP) 44, via a UTOPIA bus referred to as the "M2T bus" 46. The TSPP 44 provides datapath and control logic for storing received cells in an associated memory 47 used for cell buffering, as well as for forwarding cells from the memory 47 to the switch fabric 30.

In the transmit direction, cells are received from the switch fabric 30 by transmit cell processing logic shown as a From Switch Port Processor (FSPP) 48. Cells are buffered in a memory 51, and then forwarded to the MDM 42 via a bus shown as the "F2M bus" 52. The MDM then forwards the cells to associated PHY transmit circuitry in the switch (not shown) over respective links 54, for ultimate transmission on a network link 12.

Both the TSPP 44 and the FSPP 48 contain flow-control logic that operates according to the QFC protocol. A T2F bus 50 and an F2T bus 56 provide for communications between TSPP 44 and FSPP 48, including the exchange of QFC link flow control information between the TSPP 44 and the FSPP 48. The link flow control is implemented by means of resource management (RM) flow control cells. When a predetermined number of cells have been transferred from the memory 47 to the switch fabric 30 by the TSPP 44, the TSPP 44 sends a message indicating this fact to the FSPP 48 via the T2F bus 52. The FSPP 48 in turn generates a QFC Buffer State Update (BSU) message containing a corresponding number of transmission credits, and transmits the BSU message to an upstream transmitter on an associated link 12. The upstream transmitter uses the credits to replenish a credit pool used to control the transmission of cells. In accordance with the QFC protocol, cells can be transmitted on the link only as long as credits are available in the credit pool. Credits are consumed by the transmission of cells, and replenished by the BSU messages. If the number of credits in the credit pool diminishes to zero, cell transmission ceases until additional credits are received via a BSU message.

The TSPP 44 is also responsible for receiving RM flow control cells from the upstream node and forwarding these to the FSPP 48. The FSPP 48 uses the credits in these RM cells to replenish its pool of transmission credits, and thereby control its transmission of cells on the link 12.

The TSPP 44 and FSPP 48 participate in an XOFF/XON flow control protocol used internally within the switch. If the FSPP 48 does not have the resources to receive a cell from a TSPP 44 within the switch, the FSPP 48 transmits an XOFF indication. The absence of an XOFF signal indicates that resources are available at FSPP 48 and the cell can be received through the switch fabric 30. Once an XOFF signal is sent for a connection, transmission for that connection is generally discontinued until the connection receives an XON signal. When FSPP 48 sends an XOFF signal for a connection, the connection is marked so that when resources become available (i.e. cells are forwarded out of the memory 51), an XON signal can be sent for that connection.

QFC flow control information is sent to the FSPP 48 from the TSPP 44 via the T2F bus 50 in the form of transactions containing records of two different types: Buffer State Forward Records (BSFRs) and Buffer State Dispatch Records (BSDRs). Each type of record contains information at both the connection level and the link level. The BSDR records are sent in response to the receipt by the TSPP of a QFC BSU from the upstream receiver. These records contain credits which are used to replenish the transmission credit pool of the FSPP 48. The BSFRs contain the information about cells being forwarded out of the memory 47 by the TSPP. The FSPP 48 responds to the BSFRs by creating corresponding QFC BSU cells and transmitting them to the upstream transmitter on the link 12.

Figure 5:
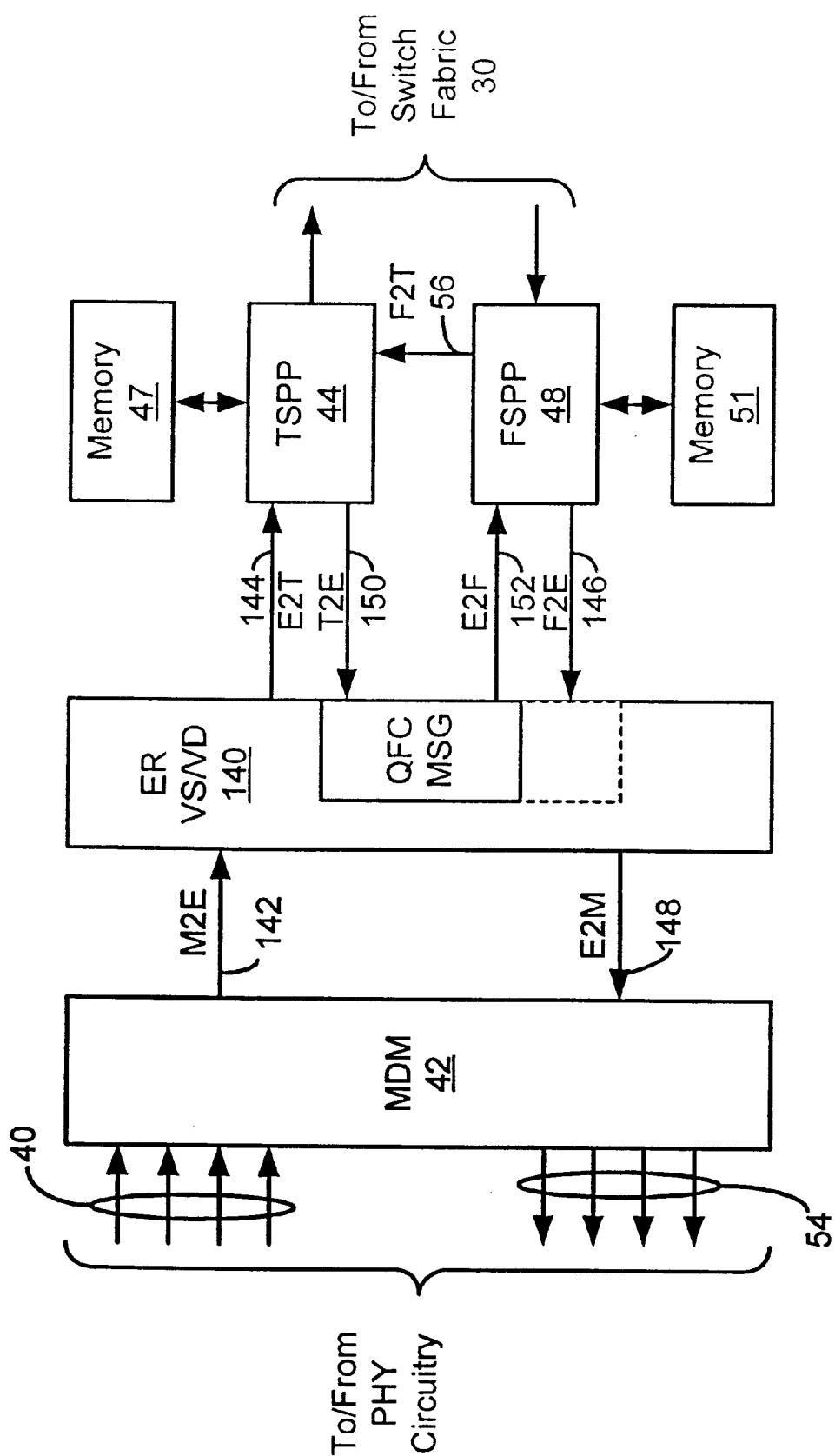
FIG. 5 is a block diagram of a SIM in accordance with the present invention in the switch of FIG. 3.

FIG. 5 shows the structure of the ER SIM 36 of FIG. 3. The ER SIM 36 in the illustrated embodiment uses the same MDM 42, TSPP 44 and FSPP 48 as used on a QFC SIM 34. Additionally, a logic block identified as ER Virtual Source/Virtual Destination (ER VS/VD) logic 140 resides between the MDM 42 and both the TSPP 44 and FSPP 48. The single M2T bus 46 of the QFC SIM 34 (FIG. 4) is replaced by a pair of identical buses shown in FIG. 5 as the "M2E bus" 142 and the "E2T" bus 144. Similarly, the single F2M bus 52 is replaced by a pair of identical buses shown as the "F2E bus" 146 and the "E2M" bus 148. While the F2T bus 56 remains unchanged, the T2F bus 60 of the QFC SIM 34 is replaced by a pair of buses referred to as the "T2E bus" 150 and the "E2F bus" 152, extending between the TSPP 44 and the ER VS/VD 140 as shown.

The function of the ER VS/VD 140 is twofold. For QFC links, the ER VS/VD 140 acts in a transparent manner. Cells received from the MDM 42 are forwarded to the TSPP 44, and cells received from the FSPP 48 are forwarded to the MDM 42. Similarly, RM cells received from the TSPP 44 via the T2E bus 150 are simply forwarded on to the FSPP 48 via the E2F bus 152. In this manner, the ER VS/VD 140 enables the ER SIM 36 to operate with QFC links.

The ER SIM 36 can also support ER links. For ER links, the ER VS/VD 140 carries out ER flow control processing with the assistance of the existing QFC functionality of the TSPP 44 and FSPP 48. In particular, the ER VS/VD 140 extracts the forward resource management (FRM) and backward resource management (BRM) cells from the cell stream received via the M2E bus 142; performs a variety of ER processing functions based in part on the buffer state information received from the TSPP 44 via the T2E bus 150; sends messages to the FSPP 48 via the E2F bus 152 in order to control the cell transmission rate and to create dummy RM cells in the transmitted cell stream; and replaces the dummy RM cells with outgoing FRM and BRM cells as required by the ER protocol. These operations are described in more detail below.

Figure 6:
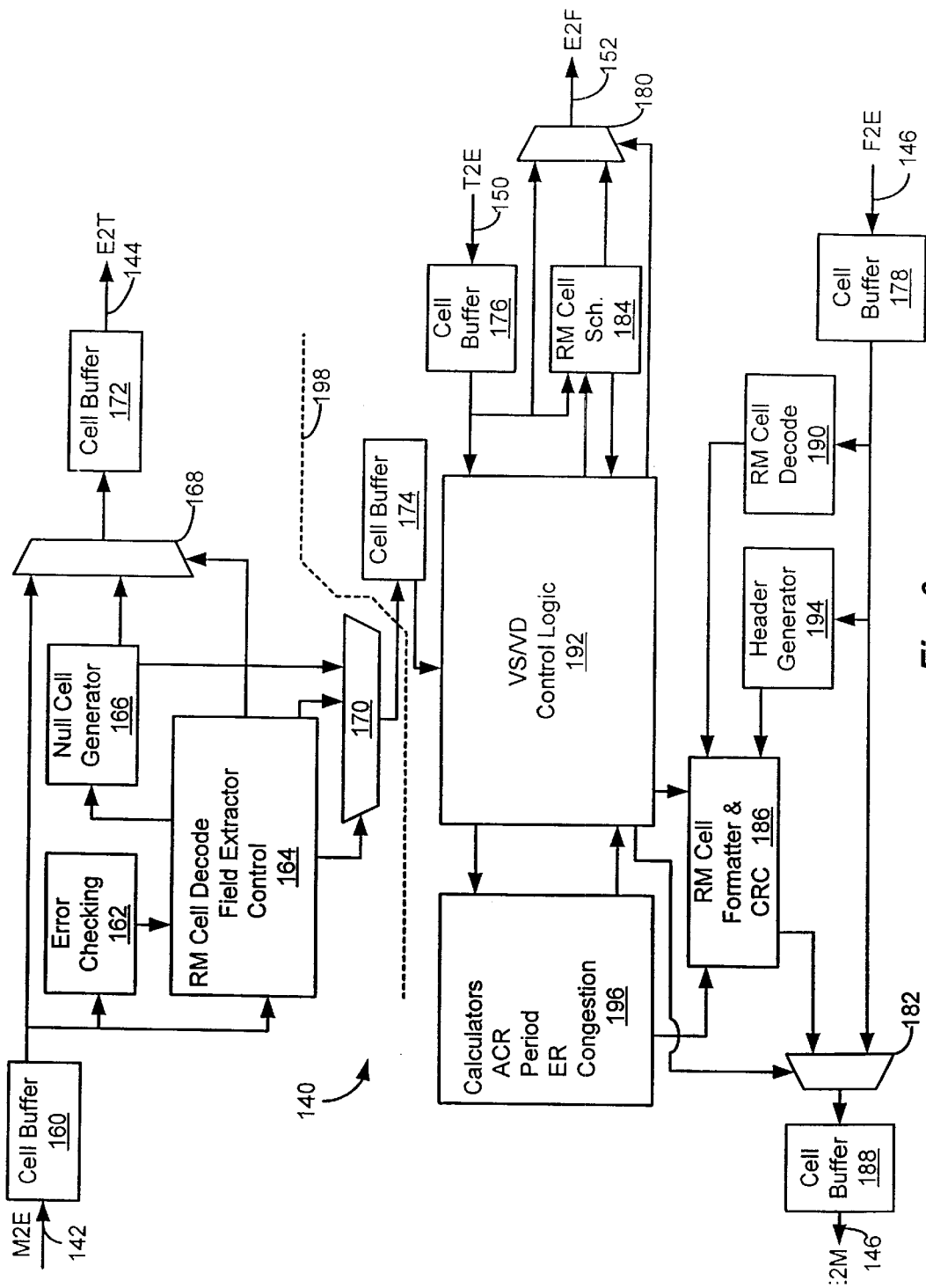
FIG. 6 is a block diagram of ER Virtual Source and Virtual Destination logic in the SIM of FIG. 5.

The structure of the ER VS/VD 140 is shown in FIG. 6. Cells received from the MDM 42 via the M2E bus 142 are stored in an input cell buffer 160. The input cell buffer 160 feeds error checking logic 162 that performs header error control (HEC) checking and cyclical redundancy code (CRC) checking. The input cell buffer 160 also feeds a logic block 164 that decodes received ER Resource Management (RM) cells, extracts information from the fields of the received RM cells, and provides control functions as subsequently described. A null cell generator 166 is used to generate null cells under the control of the logic block 164 and provide them to multiplexers 168 and 170. The multiplexer 168 selects cells from either the input cell buffer 160 or the null cell generator 166 and provides the selected cells to a cell buffer 172, which in turn sends cells to the TSPP 44 of FIG. 5 via the E2T bus 144.

The multiplexer 170 selects cells from either the logic block 164 or the null cell generator 166 and provides them to a cell buffer 174. Cells received via the T2E bus 150 and the F2E bus 146 are buffered in respective cell buffers 176 and 178. Multiplexers 180 and 182 are used to select the source of cells for the E2F bus 152 and the E2M bus 148, respectively. The multiplexer 180 selects between cells from the cell buffer 176 and Resource Management (RM) cells from RM Cell Scheduler logic 184. The multiplexer 182 selects between cells from the cell buffer 178 and RM cells from RM Cell Formatter and CRC logic 186. The output of the multiplexer 182 is provided to an output cell buffer 188, the output of which is provided to the E2M bus 148.

RM cell decoder logic 190 detects RM cells received from the FSPP 48 via the F2E bus 146, and provides indications thereof to VS/VD control logic 192 that controls the operation of the various ER VS/VD elements shown in FIG. 6. Header generator logic 194 creates RM cell headers from the information in RM cells received from the cell buffer 178, and provides the generated headers to the RM cell formatting logic 186. A set of calculators 196 are used to carry out special calculations needed by the control logic 192 to implement the ER functionality described herein. The nature of these calculations and the related operations are described below.

Although the ER VS/VD logic 140 can be thought of accurately as a single functional entity, it may be advantageous nonetheless for this logic to be implemented using multiple integrated circuits. For example, it may be beneficial to partition this logic at the output of the multiplexer 170, as indicated by dotted line 198. Such physical partitioning can help to reduce costs by reducing the requirements for input/output pins and/or circuit area for any single integrated circuit.

The ER-related operation of the ER SIM 36 is described below with reference to the block diagrams of FIGS. 5 and 6. The following four sets of messaging-related operations are described: (1) processing of cells received via the M2E bus 142; (2) processing of cells received via the F2E bus 146; (3) processing of cells received via the T2E bus 150; and (4) processing of cells scheduled by the RM cell scheduling logic 184. Additionally, certain operations of the calculator logic 196 as they relate to converting between rate-based and credit-based flow control are described below.

Figure 7A:
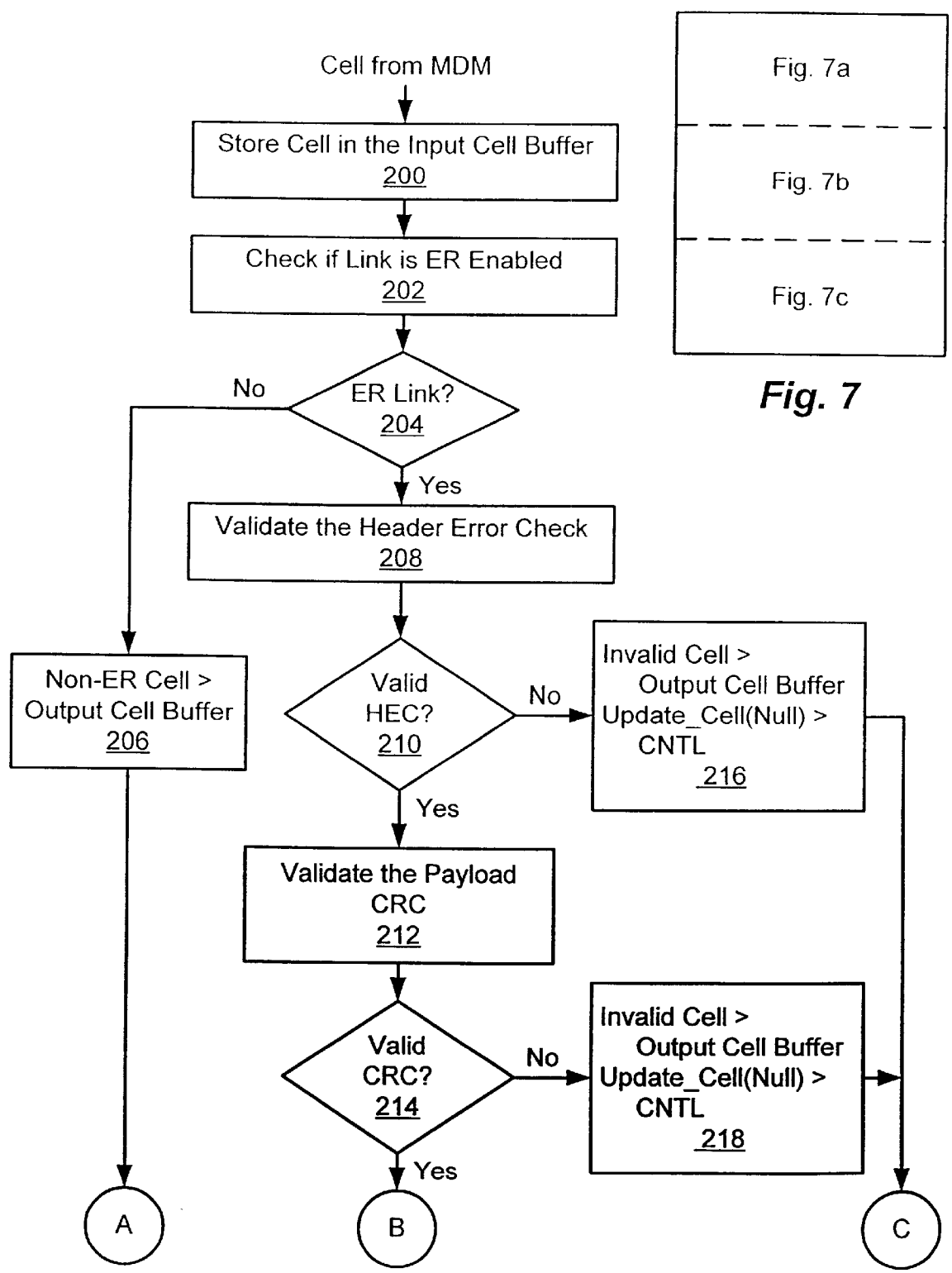
FIGS. 7–9 are flow diagrams showing various operations of the ER Virtual Source and Virtual Destination logic of FIG. 6.
Figure 7B:
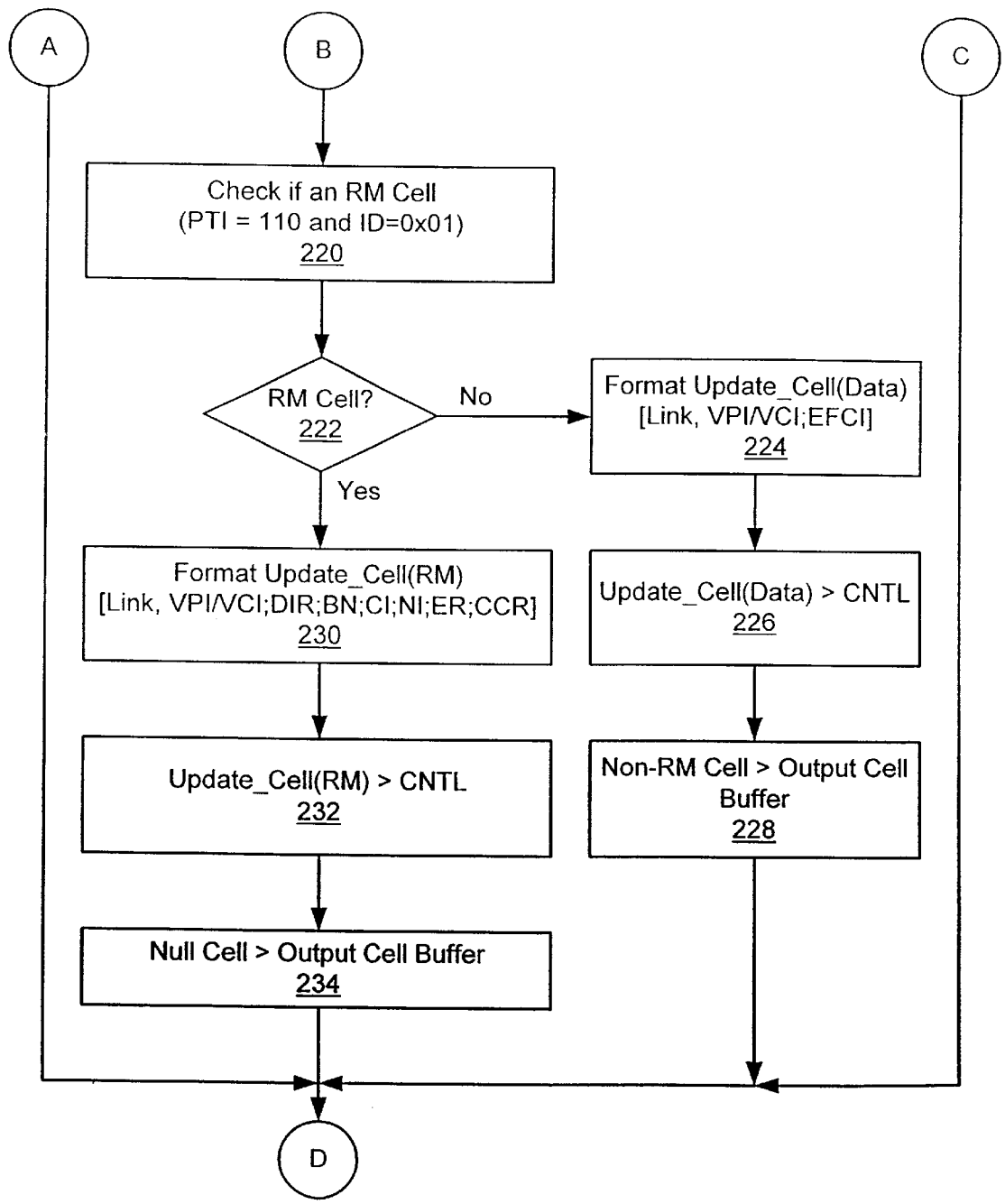
Figure 7C:
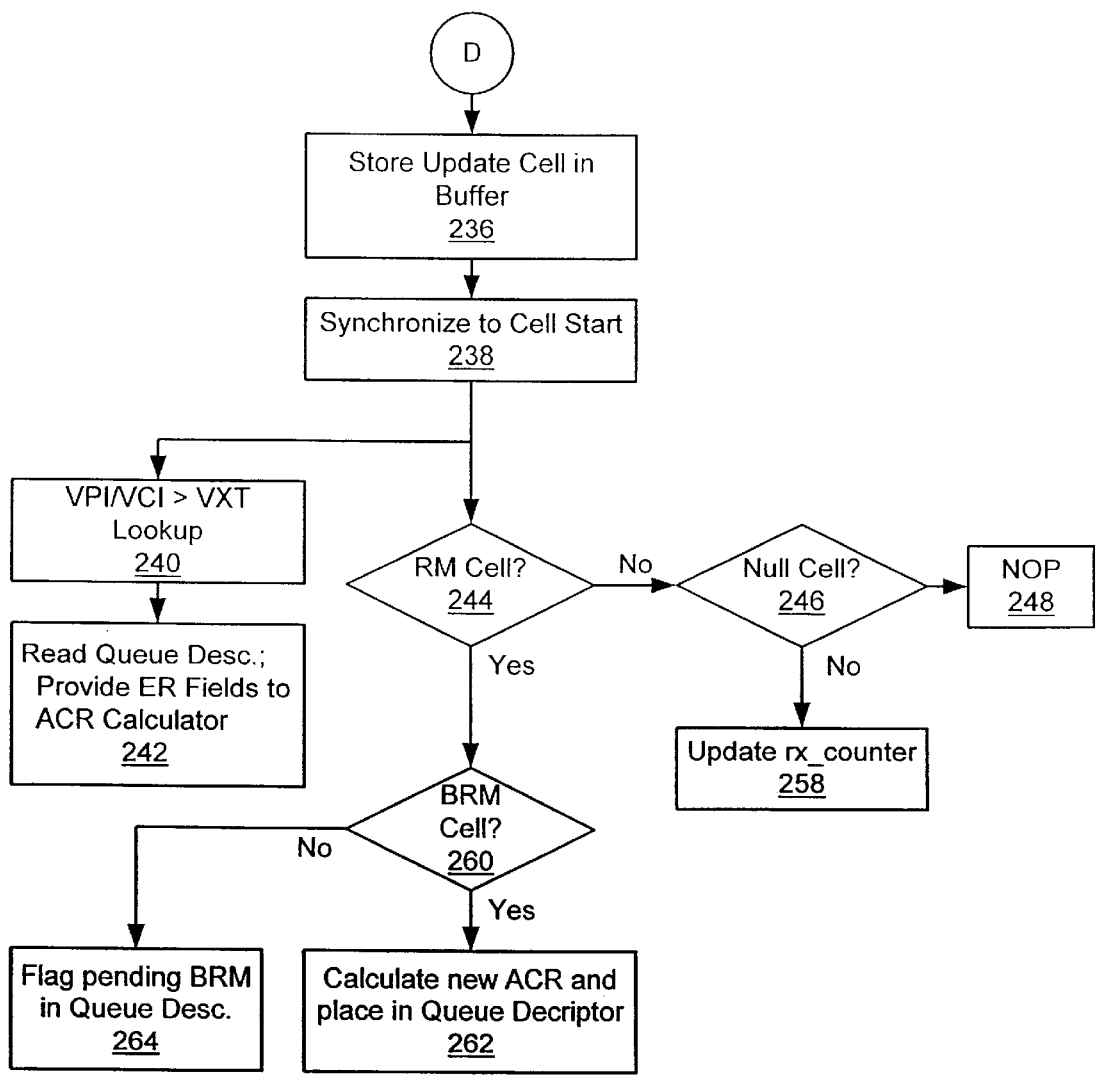

FIG. 7 illustrates the processing of cells received from the MDM 42 via the M2E bus 142. At step 200, the cells are stored in the cell buffer 160, and at steps 202 and 204 the logic block 164 determines whether the link on which the cell has been received is enabled for ER operation. If not, at step 206 the cell is placed into the output cell buffer 172 via the multiplexer 168, and forwarded to the TSPP 44 via the E2T bus 144.

If the link is an ER link, then at steps 208, 210, 212 and 214 the error checking logic 162 performs header error control (HEC) and payload CRC error checking. If either of these fails, then at step 216 or 218 the cell is sent to the TSPP 44 via the cell buffer 172. Additionally, the logic block 164 generates an "update" cell of type "null" and sends it to the VS/VD control logic 192 via the multiplexer 170 and cell buffer 174. The functions of null cells are explained below.

If the error checks succeed, then at steps 220 and 222 the RM cell decode logic in logic block 164 determines whether the received cell is an RM cell. If not, it is inferred that the cell is a data cell. In this case, then at steps 224, 226 and 228 the cell is sent to the TSPP 44 via the cell buffer 172, and an update cell of type "data" is sent to the VS/VD control logic 192. The data update cell contains a link number and a VPI/VCI pair associated with the cell, which are used by the VS/VD control logic 192 for maintaining ER-related information as described below.

If the received cell is recognized by the logic block 164 as an RM cell, then at steps 230, 232 and 234 an update cell of type "RM" is created and sent to the VS/VD control logic 192. This update cell contains the link number and VPI/VCI, as well as information from several other cell fields as follows: Backward Error Correction Notification (BECN), Congestion Indication (CI), No Increase (NI) indicator, Current Cell Rate (CCR), and Explicit Rate (ER). Additionally, a null cell is created by null cell generator 166 and placed in the output cell buffer 172 for transmission to the TSPP 44.

A null cell is a cell for which the header is all zeros (so that VPI=VCI=0, for example), which is created to replace a cell being removed from the data path for some reason. For example, if an FRM cell is received in the data path, information from the cell is sent to the VS/VD control logic 192, and the cell is replaced with a null cell to force the TSPP 44 to ignore it. This ensures that the cell is not counted for purposes of flow control, and in fact is not processed in any way by the TSPP 44. Sometimes a null cell is sent to the VS/VD control logic 192. In this case, the null cell informs the logic 192 to ignore the corresponding time slot and do nothing. This action is taken for bad cells or null cells received from the MDM 42.

When the control logic 192 receives an update cell via the cell buffer 174 (steps 236 and 238), two sets of actions are taken in parallel. The first set of actions begins at step 240. The VPI/VCI and link number are applied to a virtual translation table (VXT), which yields an identifier for the connection used only within the ER SIM 36. At step 242, this identifier is used to access a "queue descriptor", which is described briefly below. In particular, several ER-related fields of the queue descriptor are provided to the calculator logic 196 in preparation for a calculation of an updated allowed cell rate (ACR) as described below.

A queue descriptor in the VS/VD control logic 192 is a data structure containing control and current state information about a connection. For example, it contains several control values such as PCR, MCR, and congestion thresholds (see below), and a current credit count and BRM request pending flag as current state information. Each queue descriptor is associated with a corresponding queue descriptor in the TSPP 44 for the same connection. There is one queue descriptor for each connection assigned by call control software.

The second set of actions taken after step 238 begins at step 244. The update RM cell is examined to determine its type, upon which subsequent actions depend. There are three types of update cells: Null, Data and RM. At steps 246 and 248, null cells are detected and discarded (shown as no operation or NOP in FIG. 7) If the cell is a Data cell, then in step 250 a counter that is used to count received data cells, shown as "rx_counter", is incremented. The rx_counter is maintained in the queue descriptor for the connection. If the cell is a backward-type RM (BRM) cell (step 260), then at step 262 an ACR calculation is triggered as described below, and the queue descriptor is updated. If the cell is a forward-type RM (FRM) cell, then at step 264 the queue descriptor is updated to indicate that a turnaround BRM cell should be scheduled by the cell scheduler 184.

Figure 8:
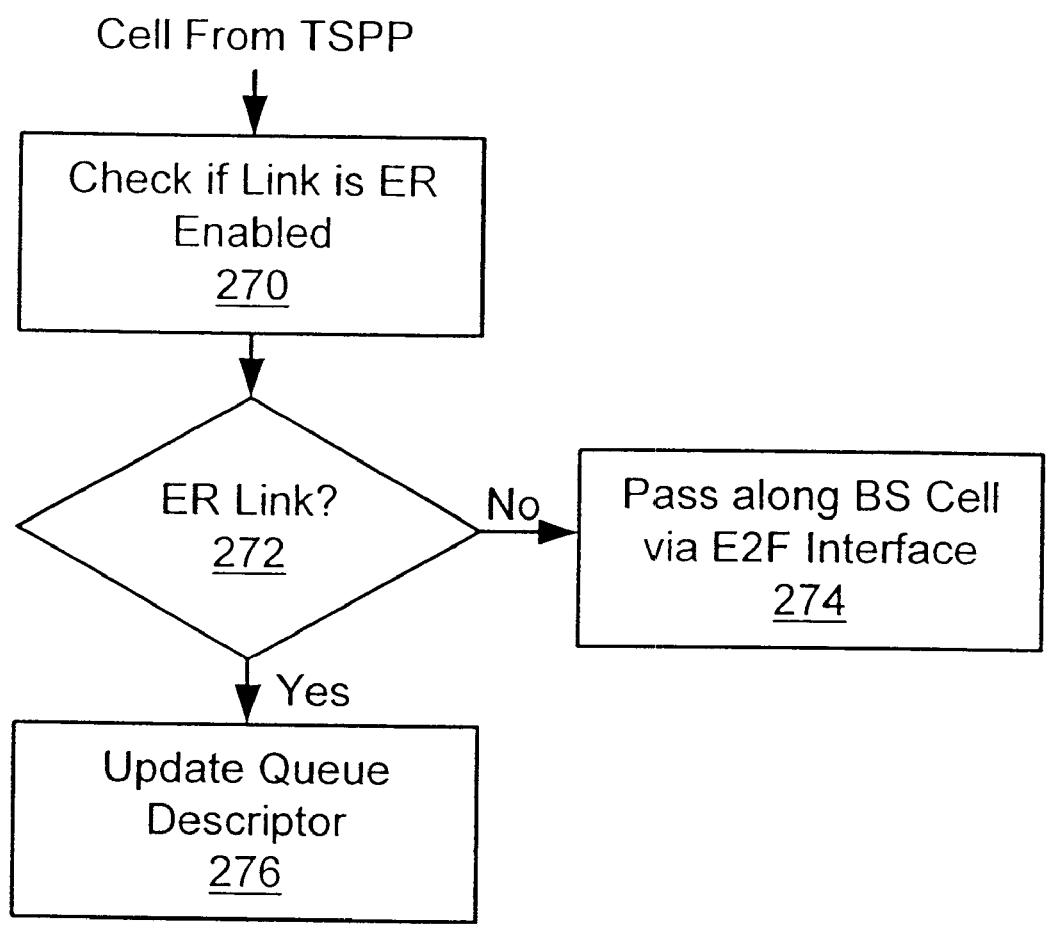

FIG. 8 shows the processing of buffer state cells (BSDRs and BSFRs) received from the TSPP 44 via the T2E bus 150. At steps 270 and 272, it is determined whether the associated link is an ER link. If not, then at step 274 the cell is passed to the FSPP 48 via the multiplexer 180 and the E2F bus 152. Otherwise, at step 276 the rx_counter in the queue descriptor associated with the connection is updated, and the cell is not forwarded to the FSPP 48.

The rate at which BSFR records are sent by the TSPP 44 may be fixed or variable, and may be subject to software control via a programmable control register for example. When the link is an ER link, it is preferable that the TSPP 44 generate BSFR records at fairly short intervals, such as one BSFR record for every cell that is forwarded out of the cell buffer memory 47. This enables the ER VS/VD logic 140 to more accurately track actual buffer usage, and thereby operate the network link as close as possible to an optimum rate for a given set of operating conditions.

Figure 9B:
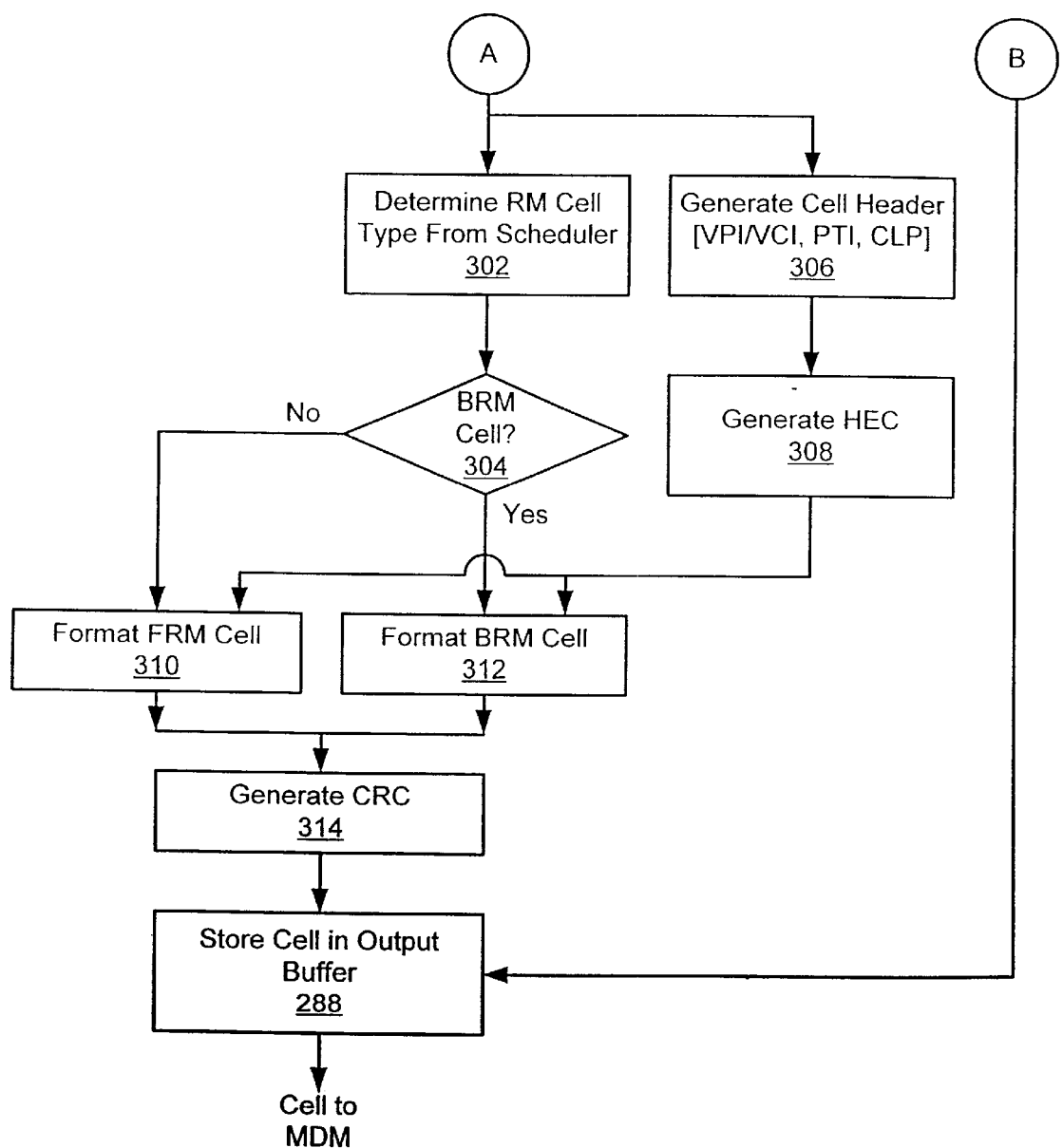

FIG. 9 illustrates the processing of cells received from the FSPP 48 via the F2E bus 146. At steps 280 and 282, the cell is stored in the cell buffer 178. At steps 284 and 286, it is determined whether the associated link is an ER link. If not, then at step 288 the cell is forwarded on to the MDM 42 via the cell buffer 188 and E2M bus 148. If the link is an ER link, then at steps 290 and 300 a determination is made whether the cell is a Buffer State Usage (BSU) RM cell generated by the QFC logic within the PSPP 48. If not, the cell is treated as a "data" cell, being forwarded at step 288 to the MDM 42 via the cell buffer 188 and E2M bus 148. Also, at step 294 the cell's VPI and VCI values are used to perform a lookup in the VXT. The VXT provides an indication whether the connection is an ER connection (step 296). If not, then no operation is performed with respect to the queue descriptors (step 297). If the connection is an ER connection, at step 298 the current credit count in the queue descriptor associated with the connection is updated to reflect the sending of the data cell.

The BSU RM cells received from the FSPP 48 are generated by the FSPP 48 in response to a BSFR generated by the RM cell scheduler 184. Each received BSU RM cell is converted into an ER RM cell and sent to the MDM 42 in the following manner. At step 300, the VPI and VCI are extracted from the cell, and at step 294 these are used for a VXT lookup. The VXT lookup returns a queue descriptor used at steps 302 and 304 to determine the type of RM cell (BRM or FRM) scheduled for output, as indicated by the RM cell scheduler 184. The queue descriptor provides values used by the calculators 196 as described below, and values used by the RM cell formatter 186 (step 298) for populating various ER fields (ER, NI, etc.) in the outgoing RM cell. At steps 306 and 308, the header generator logic 194 generates a new header based on the received BSU RM cell and provides the header to the RM cell formatter 186. At steps 310 and 312, the RM cell formatter 186 creates either an FRM or BRM cell, as dictated by RM cell scheduler 184, using the header from the header generator logic 194 and the ER field values from the queue descriptor. The FRM or BRM cell, along with a CRC value generated by CRC logic within the logic block 186 (step 314), is then placed in the cell buffer 188 and sent to the MDM 42.

The VS/VD control logic 192 and calculators 196 are responsible for generating and using the values in the various flow-control messages (both ER-related and QFC-related) to effect the necessary control over cell transmission rate in both directions on an ER link. From the perspective of the TSPP 44 and FSPP 48, an ER link appears to be a QFC link. In particular, the FSPP 48 only emits cells for transmission when it has credits, which are obtained from the BSDR records received via the E2F bus 152. For each connection on an ER link, a value known as the Allowed Cell Rate (ACR) is maintained within the corresponding queue descriptor (not shown) maintained in the VS/VD control logic 192. The ACR is a dynamic value that is re-calculated periodically in a manner described below. As a general matter, the VS/VD control logic 192 issues credits to the FSPP 48 at a frequency equivalent to the ACR. In order to avoid a phenomenon referred to as "cell clumping", a refinement to this general scheme is used as described below.

A variety of information is maintained in the queue descriptor for each connection, and used as described below. This information is identified as follows:

| | |
|---|---|
| ACR | Allowed cell rate |
| PCR | Peak cell rate |
| MCR | Minimum cell rate |
| ICR | Initial cell rate |
| RDF | Rate of Decrease factor, used for ACR adjustment |
| RIF | Rate of Increase factor, also used to adjust ACR |
| CDE | Cutoff Decrease factor, also used to adjust ACR |
| $N_{RM}$ | Max. # of data cells per FRM cell |
| $T_{RM}$ | Max. time allowed between FRM cells |
| CI | Congestion Indication from most recent cell |
| NI | No Increase indication from most recent cell |
| ER | Explicit Rate from most recent cell |
| CCR | Current Cell Rate from most recent cell |
| BPL | Buffer Pool limit |
| BPC | Current buffer pool usage |
| CNGTHR | Congestion threshold control |
| SF | Slower Factor |
| RTHR | Rising/Rising Fast Threshold control |

PCR and MCR are configuration parameters for the connection. The actual cell transmission rate, along with the ACR and ICR values, are always between the respective values of PCR and MCR. RDF, RIF, CDF, $_{RM}$, BPL, CNGTHR, SF, and RTHR are also configuration parameters, used as described below.

Figure 10:
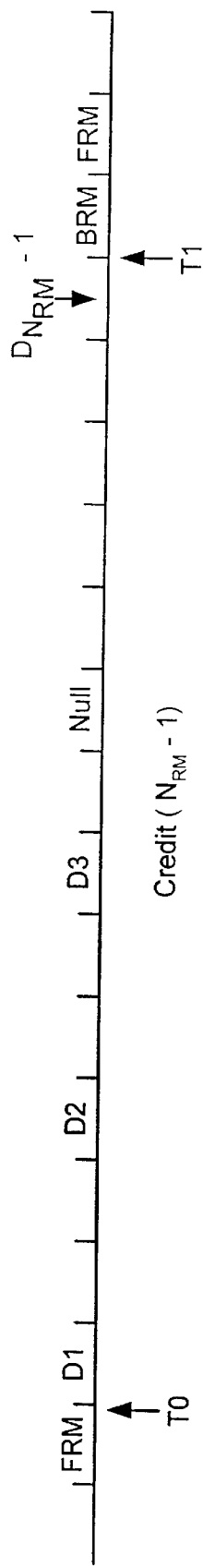
FIG. 10 is a timing diagram of a hypothetical pattern of cell transmission on an ER network link by the SIM of FIG. 5.

FIG. 10 illustrates the general relationships among $N_{RM}$ and the data cells, FRM cells, and BRM cells transmitted on a link for a connection. The length of each period TO, T1, etc. is equal to $N_{RM}$/ACR. In the scenario shown in FIG. 10, it is assumed that at the beginning of period TO, no BRM cell is scheduled to be returned, but a BRM becomes scheduled by the beginning of T1. This situation can occur, for example, immediately after cell transmission on a connection is initiated or is resumed after a period of inactivity. It is further assumed in FIG. 10 that the link has multiple active connections, so that the data cells are spaced apart by normal cell scheduling operations, and that the connection is running at exactly the ACR. If the connection is running slower, the sending of the BRM and FRM cells is generally delayed in time, until after $N_{RM}$-1 data cells have been sent. However, if the predetermined timeout value $T_{RM}$ (see list above) is reached before $N_{RM}$-1 data cells have been sent, an FRM and BRM (if scheduled) are sent without any further waiting. The issuing of credits is not affected; the VS/VD control logic 192 continues to wait until the present credit allocation is used up before issuing another set of credits to the FSPP 48.

If the link usage is relatively low during a given period Tx, an active connection may receive more cell-sending opportunities than shown in FIG. 10. In this case, the FSPP 48 tends to emit the $N_{RM}$-1 data cells in a burst at the beginning of the time period, rather than in the evenly-spaced fashion shown in FIG. 10. This cell transmission pattern is termed "clumping". It is desirable to control the amount of clumping in order to avoid "jitter" in the cell stream, which can cause timing problems and/or other difficulties in equipment receiving the cell stream.

The permissible amount of clumping on a connection is specified by a configuration parameter known as Cell Delay Variation Tolerance (CDVT). From the CDVT, the VS/VD control logic 192 calculates a number N that represents the maximum number of cells that can be sent back-to-back. N is calculated as a function of the connection ACR and the link cell rate (LCR) as follows:

$$N = \frac{CDVT}{\left[\left(\frac{1}{ACR}\right) - \left(\frac{1}{LCR}\right)\right]}$$

As described below, the ACR is re-calculated in response to each received BRM cell. Therefore, it is generally necessary to re-calculate N upon receipt of each BRM cell.

Figure 11:
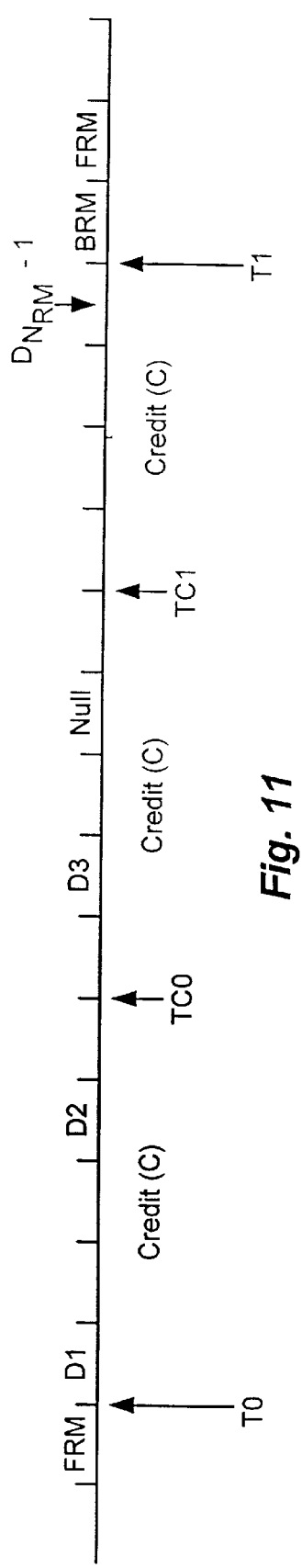
FIG. 11 is a timing diagram of a real pattern of cell transmission on an ER network link by the SIM of FIG. 5.

N is used to calculate the number of credits, C, that can be issued to the FSPP 48 at any one time. If N is greater than $N_{RM}$, then C is set equal to $N_{RM}$. Otherwise C is set equal to the largest integer factor of $N_{RM}$ that is less than N. Each period Tx is then divided into $N_{RM}/C$ equal-size sub-intervals, and credits are issued in sets of C every sub-interval, as shown in FIG. 11. For example, if N is calculated as 5 and $N_{RM}$ is 32, C is set equal to 4, and 4 credits are issued during each of 8 successive sub-intervals within each period Tx. Clumping is reduced by a factor of 8 over what it might otherwise be.

The primary adjustment of the ACR is done in response to the receipt of a BRM, and is described below. Additionally, there are two other cases in which the ACR is adjusted. First, the ACR is set equal to ICR for the very first FRM cell sent on a connection (e.g. immediately after initialization), and for the first FRM cell sent after a long period of inactivity on the connection. The second case arises when a predetermined number of FRM cells have been sent without a BRM cell's having been received. In this case, the ACR is decreased as follows:

$$ACR = max(ACR - (ACR * CDF), MCR)$$

where CDF is specified by the ATM Forum to be either 0 or a fraction $2^{-n}$, $0 \leq n \leq 6$.

When a BRM cell is received, the ACR is conditionally modified depending on the values of the CI and NI indicators and the ER value in the BRM cell. If the CI bit is set, the ACR is reduced as follows:

$$ACR = min(max(ACR - (ACR * RDF), MCR), ER)$$

If both CI and NI are equal to zero, the ACR is increased according to the following equation:

$$ACR = min(min(ACR + (PCR * RIF), PCR), ER)$$

The new ACR value is stored in the queue descriptor for the connection and used to control cell transmission rate by the FSPP 48 as described above.

Operation according to the Explicit Rate protocol requires that a Virtual Destination (VD) compute an explicit rate (ER), a congestion indication (CI) and a no increase (NI) indication, and place these values into BRM cells being sent by the Virtual Source (VS). In general, these values are set in a manner that tends to maximize cell transmission rate and to minimize the risk of cell loss resulting from lack of buffer space in the cell buffer memory 47. For each BRM cell, these values are computed to achieve one of the following four effects at the opposite (VS/VD) end of the connection:

Faster—Increase the ACR as needed

Same—Maintain the same ACR

Slower—Decrease the ACR as needed

Kill—Reduce ACR to the Minimum Cell Rate (MCR)

In order to decide which of the four above effects is desired, the ER VS/VD logic 140 considers both the current level of cell buffer utilization, referred to below as "congestion", along with the rate and direction of change of buffer utilization. The monitoring and characterization of these values are described in turn below.

The congestion status is characterized as either Not Congested, Congested, or Severely Congested. The thresholds that determine the appropriate description to use are programmable by a 2-bit CNGTHR control value in accordance with the following table:

| CNGTHR | Not Congested | Congested | Severely Congested |
| --- | --- | --- | --- |
| 00 | 0 -> 100% | n/a | n/a |
| 01 | 0 -> 24% | 25% -> 49% | 50% -> 100% |
| 10 | 0 -> 49% | 50% -> 74% | 75% -> 100% |
| 11 | 0 -> 74% | 75% -> 99% | 100% |

Thus for example, if CNGTHR is set to "01", the status is "Not Congested" when cell buffer utilization is below 25%, "Congested" when utilization is between 25% and 49%, and "Severely Congested" when utilization is 50% or more. If CNGTHR is set to "00", the status is "Not Congested" regardless of the level of buffer utilization. This feature provides a measure of software control over the operation of the ER hardware.

In addition to the current utilization status, the rate at which buffer utilization is changing is monitored and characterized according to the definitions below. In each case, the current count of buffered cells is compared to the count as it existed when the immediately preceding BRM cell for the connection was generated.

Dropping—Buffered cell count has decreased

Constant—Buffered cell count has not changed

Rising—Buffered cell count has increased by no more than a specified threshold value (see below)

Rising Fast—Buffered cell count has increased by more than the specified threshold value The threshold value is defined as a percentage of the buffer space allocated to the connection that remained unutilized when the preceding BRM cell was sent. In the illustrated embodiment, this value is programmable in accordance with the value of RTHR as follows:

| RTHR | Percentage |
| --- | --- |
| 00 | 12.5 |
| 01 | 25 |
| 10 | 50 |
| 11 | 75 |

Thus, if RHTR is set to 10, the rate-of-change description is "Rising" when the buffer utilization has increased by less than 25% of the remaining buffer capacity, and is "Rising Fast" when the buffer utilization has increased by 25% or more of the remaining capacity.

The VS/VD control logic 192 determines whether the transmission rate for the connection should be made Faster, the Same, Slower, or Killed according to the following matrix:

|              | Dropping | Constant | Rising | Rising Fast |
|--------------|----------|----------|--------|-------------|
| Not Congested | Faster  | Faster   | Same   | Slower      |
| Congested    | Faster   | Same     | Slower | Kill        |
| Severely Congested | Same | Slower | Kill   | Kill        |

Based on the desired effect as determined from this matrix, the VS/VD control logic 192 then must compute the ER, NI and CI values to be included in the outgoing BRM. These computations, described below, rely on the following parameters:

T=Time between FRM cells
C=# of forwarded data cell in time T
K1=(Severely Congested threshold)−(current cell count)
K2=C*SF where SF is a programmable "Slower Factor" control representing a percentage value as follows:

| SF | Percentage |
|----|------------|
| 00 | 3.125      |
| 01 | .25        |
| 10 | 12.5       |
| 11 | 25         |

The VS/VD Control Logic 192 calculates the Explicit Rate (ER) value for the outgoing BRM cell according to the following table:

| Desired Effect | ER Value |
|----------------|----------|
| Faster         | (C + K1)/T |
| Same           | C/T      |
| Slower         | (C − K2)/T |
| Kill           | MCR      |

The CI and NI values to be included in the BRM cell are determined according to the following:

| Desired Effect | CI | NI |
|----------------|----|----|
| Faster         | 0  | 0  |
| Same           | 0  | 1  |
| Slower         | *  | 1  |
| Kill           | 1  | 1  |

* 0 if Not Congested; otherwise 1

The remote transmitter uses the CI, NI and ER values from the BRM cell to control its transmission in accordance with the ER protocol. It may be that the remote interface to the link is another ER SIM 36, in which case the transmitter operation is controlled as described above. Other interface logic may behave slightly differently, although still in conformance with the ER protocol.

Network interface logic supporting both credit-based and rate-based flow control protocols has been described. It will be apparent to those skilled in the art that modifications to and variations of the above-described system and methods are possible without departing from the inventive concepts disclosed herein. Accordingly, the invention should be viewed as encompassing the spirit and entire scope of the appended claims.

What is claimed is:

1. Network interface logic for use with a network link of either a first type or a second type, the first type of network link using a credit-based flow-control protocol, and the second type of network link using a rate-based flow-control protocol, the network interface logic comprising:

first cell processing logic operative to receive cells from the network link and to emit cells for transmission on the network link according to the credit-based flow-control protocol; and second cell processing logic disposed between the network link and the first cell processing logic, the second cell processing logic being operative when the network link is of the first type to transfer flow-control cells between the network link and the first cell processing logic, and the second cell processing logic being operative when the network link is of the second type to (i) receive flow-control cells from the network and extend transmission credits to the first cell processing logic based on rate information contained in the received flow-control cells, and (ii) receive cell buffer status information from the first cell processing logic and generate and emit flow-control cells for transmission on the network link, the emitted flow-control cells. containing rate information calculated from the received cell buffer status information.

2. Network interface logic according to claim 1, wherein the first cell processing logic is further operative to generate and emit flow-control cells for transmission on the network link in response to flow-control messages supplied thereto, the emitted flow-control cells being formatted according to the credit-based flow-control protocol, and wherein the second cell processing logic is further operative when the network link is of the second type to (i) induce the first cell processing logic to generate and emit flow-control cells when flow-control cells are to be transmitted on the network link in accordance with the rate-based flow control protocol, and (ii) convert each flow-control cell emitted by the first cell processing logic to a flow-control cell formatted according to the rate-based flow-control protocol.

3. Network interface logic according to claim 1, wherein the flow-control cells received and emitted by the second cell processing logic are backward flow-control cells, and wherein the second cell processing logic is further operative when the network link is of the second type to (i) receive forward flow-control cells from the network link, the forward flow-control cells containing information about the rate at which cells are allowed to be transmitted on the network link by a remote transmitter at the other end of the network link, (ii) utilize the rate information from the received forward flow-control cells in calculating the rate information included in the backward flow-control cells generated and emitted by the second cell processing logic, (iii) calculate forward rate information based on the rate information in the received backward flow-control cells, and (iv) generate and emit forward flow-control cells containing the forward rate information for transmission on the network link.

4. Network interface logic according to claim 1, wherein the first cell processing logic separate receive and transmit logic, and wherein the second cell processing logic is further operative when the network link is of the first type to receive cell buffer status information from the receive logic and to forward the cell buffer status information to the transmit logic for use in controlling the transmission of cells on the network link in accordance with the credit-based flow-control protocol.

5. Network interface logic for use with a network link of either a first type or a second type, the first type of network link using a credit-based flow-control protocol, and the second type of network link using a rate-based flow-control protocol, the network interface logic comprising:

first cell processing logic operative to receive cells from the network link and to emit cells for transmission on the network link according to the credit-based flow-control protocol, the first cell processing logic including (i) a cell buffer memory in which received data cells are temporarily stored, and (ii) flow-control logic operative to control the emission of cells based on transmission credit information supplied thereto and to emit flow-control resource management (RM) cells for transmission on the network link in response to buffer state messages supplied thereto; and second cell processing logic disposed between the network link and the first cell processing logic, the second cell processing logic being operative when the network link is of the first type to transfer data cells and RM cells between the network link and the first cell processing logic, and the second cell processing logic being operative when the network link is of the second type to:

(i) transfer data cells between the network link and the first cell processing logic;

(ii) extract RM cells received from the network link and refrain from forwarding the extracted RM cells to the first cell processing logic, the extracted RM cells including forward RM (FRM) cells and backward RM (BRM) cells, the FRM cells containing information about the rate at which cells are allowed to be transmitted on the network link by a remote transmitter, the BRM cells containing information about the rate at which cells should be transmitted on the network link to a remote receiver;

(iii) exchange buffer state messages with the first cell processing logic to (1) obtain information about the utilization of the cell buffer memory by received cells, (2) supply transmission credit information to the first cell processing logic, the transmission credit information being calculated from predetermined rate parameters and the rate information in the extracted BRM cells, and (3) induce the first cell processing logic to generate and emit RM cells when BPM and FPM cells are to be transmitted on the network link in accordance with the rate-based flow control protocol; and (iv) convert each PM cell emitted by the first cell processing logic to either an FRM cell or a BRM cell and forward the FRM or BRM cell to the network link, each BRM cell containing feedback rate information calculated from the rate information in a corresponding extracted FRM cell and from the buffer utilization information received from the first cell processing logic, and each FRM cell containing forward rate information calculated from the predetermined rate parameters and the rate information in the extracted BRM cells.

* * * * *

UNITED STATES PATENT AND TRADEMARK OFFICE
CERTIFICATE OF CORRECTION

PATENT NO.     : 6,452,903 B1
DATED          : September 17, 2002
INVENTOR(S)    : David N. Peck et al.

It is certified that error appears in the above-identified patent and that said Letters Patent is hereby corrected as shown below:

<u>Title page,</u>
Item [57], ABSTRACT,
Line 13, "DRM" should read -- BRM --;

<u>Column 9,</u>
Line 19, "PSPP" should read -- FSPP --;

<u>Column 10,</u>
Line 17, "CDE" should read -- CDF --;
Line 30, "CDF, $_{RM}$, BPL," should read -- CDF, $N_{RM}$, BPL, --;

<u>Column 13,</u>
Line 27, below Percentage, ".25" should read -- 6.25 --;

<u>Column 16,</u>
Line 15, "BPM and FPM" should read -- BRM and FRM --; and
Line 18, "PM" should read -- RM --.

Signed and Sealed this

Eleventh Day of November, 2003

JAMES E. ROGAN
*Director of the United States Patent and Trademark Office*